United States Patent

Saltini et al.

[15] 3,691,531

[45] Sept. 12, 1972

[54] ELECTRONIC COMPUTER WITH CYCLIC PROGRAM MEMORY

[72] Inventors: Fabrizio Saltini, Modena; Vittorio Eccettuato, Cornaredo, both of Italy

[73] Assignee: Ing. C. Olivetti & C., S.p.A., Ivrea (Turin), Italy

[22] Filed: June 18, 1970

[21] Appl. No.: 47,338

[30] Foreign Application Priority Data

June 21, 1969 Italy....................52336 A/69

[52] U.S. Cl...............................................340/172.5

[51] Int. Cl...............................................G06f 13/02

[58] Field of Search..................................340/172.5

[56] References Cited

UNITED STATES PATENTS

| | | | |
|---|---|---|---|
| 3,475,732 | 10/1969 | Avsan et al. | 340/172.5 |
| 3,311,891 | 3/1967 | Brady et al. | 340/172.5 |
| 3,444,527 | 5/1969 | Hartley et al. | 340/172.5 |
| 3,341,817 | 9/1967 | Smeltzer | 340/172.5 |
| 3,469,244 | 9/1969 | Perotto et al. | 340/172.5 |
| 3,302,176 | 1/1967 | McLaughlin | 340/172.5 |
| 3,266,020 | 8/1966 | Cheney et al. | 340/172.5 |

*Primary Examiner*—Paul J. Henon
*Assistant Examiner*—Sydney R. Chirlin
*Attorney*—Birch, Swindler, McKie & Beckett

[57] ABSTRACT

An electronic computer having a cyclic, serial access program storing tape memory and a random access memory for storing data. The random access memory also includes an input-output register and portions for storing the address of the next instruction to be executed in the program memory and an indirect address. A predetermined time after transferring an instruction to an instruction register the program memory checks to see if the execution of the instruction has been completed. If it hasn't been, the motion of the tape is stopped until it is completed. Also provided are means for shifting the contents of a selected data memory register.

13 Claims, 6 Drawing Figures

INVENTORS
FABRIZIO SALTINI
VITTORIO ECCETTUATO

INVENTORS
FABRIZIO SALTINI
VITTORIO ECCETTUATO

INVENTORS
FABRIZIO SALTINI
VITTORIO ECCETTUATO

ELECTRONIC COMPUTER WITH CYCLIC PROGRAM MEMORY

BACKGROUND OF THE INVENTION

1. Field of the Invention

This invention relates to electronic computers having both serial and random access memories where the relationship of the memories is such as to maximize processing speed at a minimum cost.

2. Description of the Prior Art

Most computers in use today use a single operational memory for storing both the program and the data being operated upon. Access to the memory may be serial, such as in disk, drum or delay line memories, or it may be random, such as in magnetic core or thin film memories.

Systems using either of these types of memories have characteristic disadvantages. Serial memories are relatively inexpensive but have such a long access time that they severely limit the processing speed of a machine in which they are used. Any arithmetic or logical operation on data stored in the memory usually requires a minimum of two memory cycles and often many more. Since the memory cycle time is usually measured in milliseconds, the time required to perform even a simple calculation is intolerably long in applications where high speed processing is needed.

Random access memories are much faster than serial memories, with access times in the order of microseconds or less. These memories, however, are much more expensive than a serial memory of the same capacity and one large enough to store the program and the data to be processed is uneconomical for use in many lower cost systems.

It has been known in some computers to use a serial access memory for storing the program to be executed and a random access memory, or a group of registers, for storing the data to be operated upon. This system has the advantage of minimizing the size of the high speed portion of the memory and there-by minimizing its cost while at the same time retaining a high processing speed. The program storing serial access memory may be made interchangeable, thereby allowing easy changing of the program.

These systems however still had had problems in that their operational speed has been rather slow both because of the general organization of the machine and because the starting and stopping of the tape after each instruction adds greatly to the processing time.

Shift registers and barrel switches have been widely used in computers for shifting the contents of a register by a selected number of places to the right or the left. Both of these systems are able to shift the contents of the selected register quite rapidly but both require a substantial amount of hardware and thus are often too expensive for use in low cost computer systems. These lower cost systems need a method of shifting their contents which does not entail a large amount of hardware, even if at some sacrifice in speed.

SUMMARY OF THE INVENTION

In accordance with the present invention, there is provided an electronic computer having an operational memory which includes a serial access cyclic portion for storing the program for controlling the computer and a random access multi-register portion for storing the data to be operated upon and the results of operations. Also provided are means responsive to program instructions for performing jumps to selected locations in said program. The successive addresses of the program instructions may be interspersed on the serial portion of the memory for allowing access to the next instruction of the program in the serial portion of the memory upon completion of the previous instruction without requiring the stopping and restarting of the tape. Also provided are means for shifting the contents of a selected memory register including means for sequentially exchanging the successive characters of the selected memory register with a single character storing device.

Various other objects advantages and features of the invention will become more apparent in the following specification with its appended claims and accompanying drawings, in which:

DETAILED DESCRIPTION OF THE INVENTION

The invention can best be understood from the following detailed description of the illustrated embodiment.

GENERAL DESCRIPTION

Figure 1:
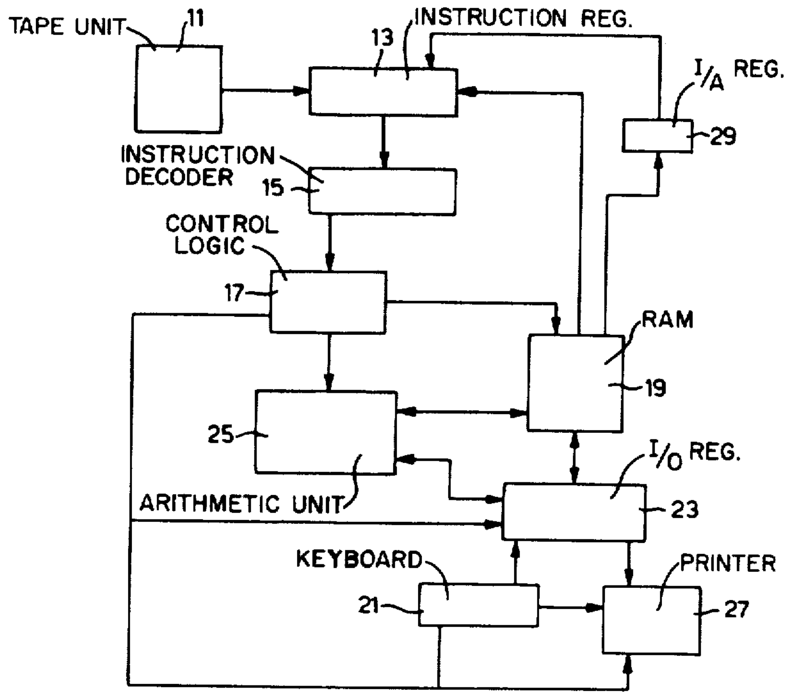
FIG. 1 is a block diagram of an embodiment of a computer according to the invention.

Referring to FIG. 1 of the drawings, the instructions of the program to be executed are read one at a time from the serial portion of the operational memory, which may be formed of a loop of magnetic tape, by the tape unit 11 and transferred to the instruction register 13. The addresses of successive instructions of the program are preferably physically spaced on the tape loop in a manner such that, for most arithmetic and logical instructions, the execution time of the instruction is somewhat less than the time necessary for the following instruction to become available on the tape. This enables the tape to continue to run continuously rather than having to stop and start with each instruction. Other instruction addresses may be interspersed between successive instructions of the program.

The instruction read from the tape loop is stored in the instruction register 13 while it is being executed. The instruction in the register 13 is decoded in decoder 15 whose output is connected to the control unit 17. The control unit 17 then controls the operation of the computer to execute the instruction.

The data to be operated on in carrying out the program is stored in the random access memory 19. Data may be entered into the memory 19 from the keyboard 21 through the input-output register 23. From the I/O register 23 the data may be transferred either to the memory 19 or directly to the arithmetic unit 25 for processing. Data stored in the memory 19 may be transferred to the printer 27 through the I/O register 23 for being printed out.

In the illustrated embodiment of the invention the keyboard 21 may include a numerical keyboard for entering numbers into the I/O register 23, an alphanumeric keyboard for typing information directly by means of the printer 27 and a command keyboard for entering commands into the control unit 17. The use of these keyboards and the length of the numerical data which may be entered are controlled by control unit 17 in response to program instructions.

The register 29 may be used for the indirect addressing of locations in the memory 19 and in the program storing tape unit 11.

Figure 2:
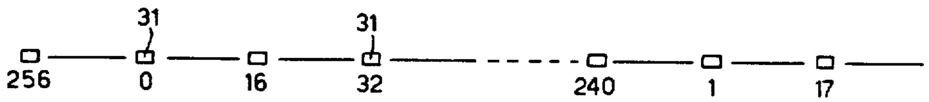
FIG. 2 shows the preferred way of interspersing the addresses of program instructions.

Referring to FIG. 2 of the drawings there is shown a portion of one of the tracks on the tape loop. In the illustrated embodiment of the invention each track can contain up to 256 instructions and there are 5 tracks on the tape. Each instruction is associated with the track address 31 recorded immediately before it and, in the illustrated embodiment, the addresses 31 are interspersed so that each instruction has 15 instructions recorded between it and the next instruction to be executed. Other schemes of arranging the instructions on the tape are also possible depending on the speed of movement of the tape and on the processing speed of the computer.

In the instruction format used in the illustrated embodiment of the invention, each instruction consists of four 4-bit characters. The first character is a general operation code which indicates how the other three characters are to be interpreted. This character may indicate, for example, Arithmetic, Tabulation, Keyboard Input, Print Out, Paper Handling, Jump or Multiplication operations.

The significance of the following three characters of the instruction depends on the value of the first character. They may be, for instance, addresses for the memory 19, specific operation codes, constants, addresses for the tape unit 11 or codes for controlling the keyboard 21 or the printer 27.

Figure 3:
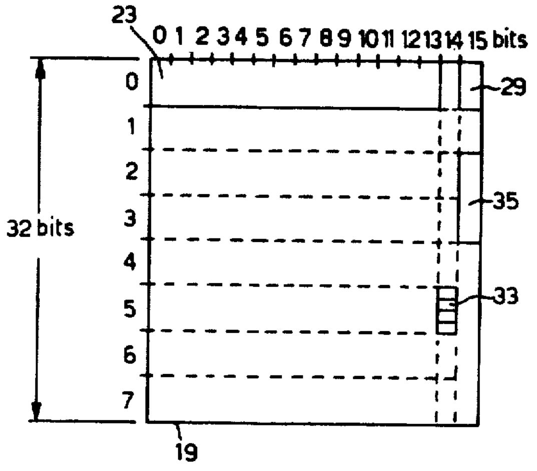
FIG. 3 shows the organization of the random access portion of the operational memory.

The memory 19 may, in the preferred embodiment of the invention, be made up of a commercially available 32 × 32 bit magnetic core memory, a 32 × 16 bit portion of which is illustrated in FIG. 3 of the drawings. The 32 bit side of the illustrated portion of the memory 19 may be divided into eight groups of four rows of bits, numbered 0 through 7 in FIG. 3, for making up 8 registers. Each register has a capacity of 14 four-bit digits, one digit being stored in each of the columns numbered 0 through 13 in FIG 3. Column number 14 contains eight groups 33 of 4 bits, each of which is associated with the register whose rows it falls in. The least significant bit of each group 33 may be used for indicating the sign of the number stored in the associated register and another one of these bits may be used to indicate when the contents of a register are not equal to zero. In the preferred embodiment of the invention the input-output register 23 is physically a part of the memory 19 and occupies register number 0 of the portion of the memory 19 illustrated in FIG. 3.

Column number 15 of the memory 19 may be used as a service area. In the preferred embodiment of the invention the 4 bit indirect address register 29 is physically a part of this service area and occupies the same memory rows as the I/O register 23. Also stored in the service area is other information which is desired to be protected from loss in case of power failure. The address, on the program tape, of the program instruction presently being executed is stored in the 8 bit portion 35 of the service area. The indication of an overflow in an arithmetic operation and selected jump conditions may, for example, also be stored in the service area.

The other half of memory 19 may also be divided into 8 fourteen digit registers so that the entire memory may include 16 data registers and the input-output register 23.

As stated above, the type of operation which an instruction orders is determined by the first four bit character of the instruction.

If the first character of the instruction is an arithmetic operation code, the second character is a detailed operation code which defines the particular operation to be performed. The third and fourth characters of the arithmetic instruction are the address of two registers in the memory 19 on which the operation is to be performed. The addresses of the memory registers are 4 bits long and may be stored in either or both of the third or fourth character of an arithmetic instruction. The operation ordered by the detailed operation code may be different depending on whether the memory register address is located in the third or fourth character of the instruction.

The arithmetic instructions are performed in two operation cycles. The indicated operation is first performed on the memory register addressed by the third character of the instruction and then on the register addressed by the fourth character. If the registers addressed by the third and fourth characters of an arithmetic instruction are called R3 and R4, respectively, and the input-output register 23 is called I/O, the following operations are typical of the operations which may be performed:

| | |
|---|---|
| (1) R 3 − I/O → R 3 | R 4 − I/O → R 4 |
| (2) R 3 + I/O → R 3 | R 4 + I/O → R 4 |
| (3) R 3 → I/O | R 4 − I/O → R 4 |
| (4) R 3 → I/O | R 4 + I/O → R 4 |
| (5) R 3 → I/O; O → R 3 | R 4 + I/O → R 4 |
| (6) R 3 → I/O; O → R 3 | R 4 − I/O → R 4 |
| (7) R 3 → O | R 4 → O |
| (8) I/O → O | |
| (9) I/O → O, except for the least significant digit of the I/O | |

Normally, when the contents of a memory register are read for performing an operation they are automatically rerecorded so as to give the effect of a nondistructive read-out. In the instructions indicated at 5 and 6, however, the contents of R3 are not rerecorded so that R3 is erased when its contents are transferred to the I/O. In the instructions indicated at 7, 8 and 9 the contents of the addressed registers or the I/O register 23 are erased. In the execution of the instructions indicated at 3 through 6, the contents of R3 are first transferred to the I/O register 23 and then the operation with R4 and the I/O is performed.

If the third character of an arithmetic instruction is zero the contents of the indirect address register 29 are transferred to the third character place of the instruction register 13 by the control unit 17 and used as the memory register address for the instruction. If the fourth character of an arithmetic instruction is zero no operation is performed on the fourth character.

It is also possible with a particular arithmetic instruction to transfer the contents of the third and fourth character of the instruction to the I/O register 23. This is useful when it is desired to use these characters as a constant for the program.

If the first character of an instruction is a tabulation operation code, the instruction commands the horizontal tabulation of the printer 27. In this type instruction the second and third characters contain the location of the end of the tabulation movement and the fourth character indicates whether the operation is to be executed immediately or if the location of the end of the tabulation movement is merely to be stored mechanically in the printer 27.

A third value of the initial character of an instruction is used for indicating an instruction for controlling the numerical keyboard, for setting bits in the service area of the memory 19 for indicating jump conditions or for operating on the I/O register 23 and/or the indirect address register 29. The second character of this type of instruction may be used to set the maximum number of characters which may be entered into the I/O register 23 from the numerical keyboard in those instructions which unlock the numerical keyboard. The third character of the instruction may be used for setting or resetting selected bits in the service area of the memory 19 for indicating or extinguishing jump conditions. It also may order the transfer of the contents of the least significant character of the I/O register 23 to the indirect address register 29. The fourth character of the instruction may order the unlocking of the numerical keyboard with the number of digits which may be entered being controlled by the second character of the instruction. The fourth character may also be used to invert the sign of the I/O register 23 or for transferring the contents of the indirect address register 29 to the least significant character of the I/O register 23.

The initial character of an instruction may also take a fourth value which indicates that the instruction orders the printing of the contents of the I/O register 23 either in black or in red. An instruction of this type may also be used for controlling the punching of the contents of the I/O register 23 on paper tape by a paper tape punch unit (not shown).

The second character of a printing instruction may be used to determine the number of characters from the I/O register 23 which are to be printed by the printer 27. The third character determines whether the number is to be printed with American or European punctuation and can order the printing to take place only if the number in the I/O register is negative. The fourth character determines whether the printing of the I/O register 23 is to take place in red or black and whether it is also to be punched on paper tape. The fourth character may also order that the contents of the second and third character of the instruction be treated as a constant and transferred to the I/O register 23 for punching or printing either in black or in red.

A fifth value of the initial character of an instruction indicates that the instruction either controls the movement of the paper in the printer 27 or unlocks the alphanumeric keyboard. The second character selects the various rollers or sprockets of the printing unit 27 for controlling the movement of the various paper rolls or sheets. The third and fourth characters of this type of instruction control the paper movement with the controls selected by the second character and determine whether the printing of the information entered from the alphanumeric keyboard is to take place in black or red and whether the information printed is also to be punched on paper tape.

The printer 27 may be similar to that described in U.S. Pat. No. 3,404,765 which is assigned to the assignee of the present invention.

A sixth value of the initial character of an instruction indicates that the instruction orders a program jump. The second character of the instruction indicates the type of jump and the third and fourth character contain the 8 bit address on the program tape of the end of the jump.

Typical types of jumps are:

1. Unconditional.
2. Jump if I/O register 23 is not zero.
3. Jump if a selected jump condition indicating bit in the service area of the memory 19 is set.
4. Jump if overflow bit is set.
5. Unconditional jump to the track of the program tape indicated by the third character.
6. Jump if the sign of the I/O register 23 is negative.
7. Jump if selected keys on the command keyboard have been depressed.

If the third character of the instruction is zero, the control unit 17 causes the contents of the indirect address register 29 to be transferred to the third character of the instruction register 13 and used as a portion of the program tape address.

In the execution of a jump instruction, control unit 17 first determines whether the jump condition has occured. If it has, the control unit 17 transfers the jump address from the instruction register 13 to the portion 35 of the service area of the memory 19 where the address of the next instruction to be executed is stored.

A seventh value of the initial character of the instruction is used for multiplication instructions. The second character of the instruction indicates whether the operation is to take place with a multiplication of the result by $10^n$ or $10^{-n}$, where $n$ can vary between 0 and 7. The third character is the address of the memory register which contains the multiplier and the fourth character is the address of the memory register which is to receive the product.

The multiplication takes place between the contents of the register indicated in the third character of the instruction and the contents of the I/O register 23. If the third character of the instruction is zero the contents of the register indicated by the fourth character of the instruction is shifted by the amount indicated by the second character of the instruction. If both the third and the fourth characters are zero, the contents of the I/O register 23 are shifted by the amount indicated by the second character of the instruction.

The first character of a multiplication instruction also indicates whether the multiplication is to take place with rounding and what type of rounding is to be used.

Figure 4:
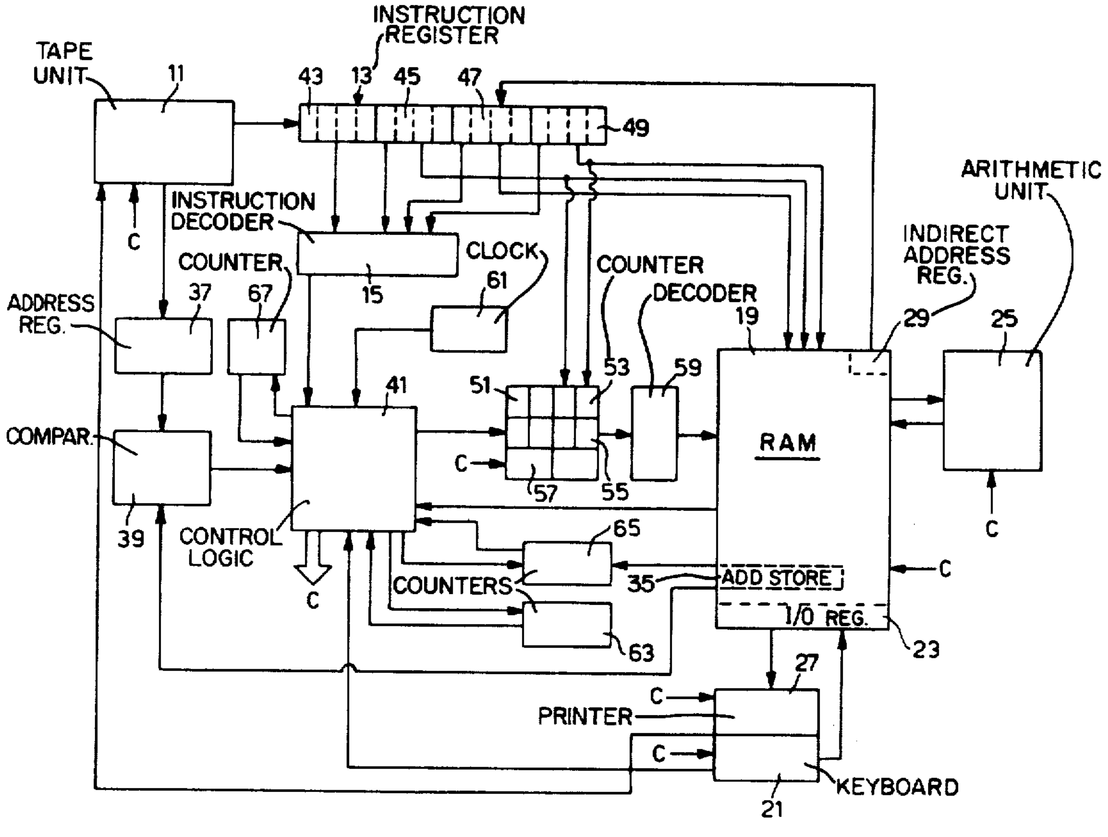
FIG. 4 is a more detailed block diagram of a computer according to the invention.

The operation of the computer in carrying out the instructions of the program will now be described in relation to the more detailed block diagram shown in FIG. 4 of the drawings. The addresses 31 (FIG. 2) of the instructions on the program type are read by the tape unit 11 as the portion of the tape on which they are recorded passes under the reading head and are transferred in turn to the 8-bit address register 37. The address in the register 37 is compared, bit-by-bit, in the comparator 39 with the address of the next instruction to be executed which is stored in the address storing portion 35 of the service area of the memory 19. If the comparison yields equality, the comparator 39 signals the control logic 41 to this effect and the control logic 41 signals the tape unit 11 over channel C to load the associated instruction into the instruction register 13. The address storing portion 35 of the service area is incremented at the end of the execution of each instruction except an executed jump instruction so that is will contain the address of the next instruction to be executed.

The instruction register 13 contains four 4-bit sections 43, 45, 47 and 49 which store the first, second, third and fourth characters, respectively, of the instruction to be executed.

The first character of the instruction, in portion 43 of the register 13, is decoded by decoder 15 and causes the control logic 41 to generate commands over channel C for controlling the operation of the computer to execute the instruction.

In the illustrated embodiment of the invention the memory 19 operates in a completely serial fashion. To select the rows of a memory register, the address of the selected register is inserted into the four bit counter 51 of counter system 53. The column addressed is selected by the 4 bit counter 55 included in the counter system 53 and one of the 4 bits within the column of the register is addressed by the 2 bit counter 57.

The counters of the counter system 53 address the memory 19 through the decoder 59. In addressing the bits of a memory register during arithmetic, shift and transfer operations, the counters 55 and 57 are originally set at zero by the control logic 41 for addressing the least significant bit of the least significant digit. The 2 bit counter 57 counts on every one or two memory cycles for addressing the next higher order bits in turn. The overflow of the counter 57 is used to increment counter 55 in order to address the next higher order digit of the selected memory register.

In order to address the bits of the service area of the memory 19, the control logic 41 inserts the address of the selected bit of the service area directly into the counter system 53. If it is desired to address a plurality of bits, such as in the case of the instruction address storing portion 35, the address of the least significant bit of portion 35 is loaded by the control logic 41 into the counter system 55 and then the counter 57 counts on the memory cycles in the same manner as was described above. In this case however it overflow is used to increment the register counter 51 instead of the column counter 55.

Figure 5:
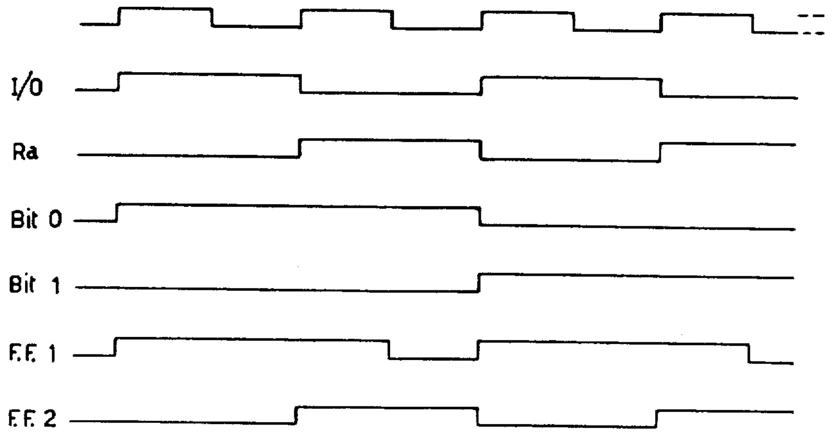
FIG. 5 is a timing diagram of memory addressing operations.

The memory cycles are synchronized and controlled by the memory clock signal shown in FIG. 5 of the drawings. This clock signal may be obtained by a frequency division of the system clock generated by oscillator 61. The memory clock signal is high during the first half of the memory cycle for allowing the reading of the addressed bit and low during the second half of the memory cycle for allowing the writing of a bit of information into the addressed location.

In executing an arithmetic type instruction which orders the transfer of the contents of the I/O register 23 to an addressed memory register, here called R*a*, the control logic 41 first clears the counter system 53. In this condition the counter system 53 addresses the least significant bit of the I/O register 23. The addressing of the I/O register is indicated by the trace labeled I/O in FIG. 5 going high. During the first half of the following memory cycle the addressed bit of the I/O register 23 is read from the memory and stored in Flip-Flop No. 1 (not shown) which may be located in the arithmetic unit 25, as is indicated by the trace labeled F.F. No. 1 in FIG. 5. In the second half of the cycle the bit is rewritten into the same place in memory without erasing it from Flip-Flop No. 1.

At the beginning of the next memory cycle the control logic 11 transfers the register address Ra stored in the third or fourth character place of the instruction register 13 to the counter 51 without erasing the character place of the instruction register 13, as is indicated by the trace labeled Ra going high. In this condition the least significant bit of the register Ra is addressed by the counter system 53. During the second half of this next memory cycle the control logic 41 writes the bit stored in the Flip-Flop No. 1 into the addressed location thereby completing the transfer of the bit from the I/O register 23 to the register R*a*.

The beginning of the next memory cycle increments the bit counter 57, as is indicated by the trace labeled BIT 0 going low and the trace labeled BIT 1 going high, and clears the counter 51. Thus the second bit of the least significant character of the I/O register 23 is addressed by the counter system 53.

The computer continues in this manner transferring the subsequent bits from the I/O register 23 to the Flip-Flop No. 1 and from there to the register Ra until all the bits are transferred. Every fourth bit the counter 57 overflows and increments counter 55 for addressing the next character.

The transfer of information from a register Ra to the I/O register 23 takes place in much the same manner with the exception that the control logic 41 initially clears only counters 55 and 57 and transfers the address of the register Ra to the counter 51.

In operations, such as the transfer of a constant contained in the third and fourth characters of an instruction in the instruction register 13 to the I/O register 23, when it is necessary to address only one memory register, the bit counter 57 is incremented by the control logic 41 every memory cycle instead of every second memory cycle.

Addition and Subtraction

Addition and subtraction are performed algebraically in the arithmetic unit 25 on the contents of the I/O register 23 and the memory register Ra addressed by the third or fourth character of the instruction in the instruction register 13.

In executing such an instruction, the computer first performs the preliminary operations of determining whether an addition or subtraction operation is to be performed by reading the sign bit, stored in the least significant bits of memory column number 14, of the I/O register 23 and the register Ra. The control logic 41 also senses the instruction character in the second character place 45 and whether address of the register is contained in the third or fourth character place of the register 13.

If a subtraction operation is to be performed, the control logic 41 performs a dry run of the operation, restoring the contents of the registers, in order to determine which number is larger. This is done because it is necessary to use a different algorithem depending on whether the subtrahend is larger or smaller than the minuend. In order to simplify the hardware the machine of the illustrated embodiment of the invention always subtracts the smaller number from the larger.

In an addition operation, the addressing of the memory takes place in a manner similar to that described for the transfer of a number from the I/O register 23 to an addressed register Ra. Again the control logic 41 initially clears the counter system 53 for addressing the least significant bit of the I/O register 23, transfers this bit to Flip-Flop No. 1 and rerecords the bit in the I/O register 23. On the second memory cycle the control logic 41 again transfers the register address from the instruction register 13 to the counter 51. During the first half of this second memory cycle, however, the control logic 41 transfers the addressed bit of the Ra register to the Flip-Flop No.2, which also may be included in the arithmetic unit 25, as is illustrated by the trace labeled F.F. No. 2 in FIG 5. The contents of these flip-flops are added by the arithmetic unit 25 and the sum bit is written in the addressed bit of the Ra register during the second half of the second memory cycle. The carry bit is retained by the arithmetic unit 25 for the next cycle. The control logic 41 steps through all the bits of the addressed registers incrementing the bit counter 57 every two memories cycles in the same manner as was described above to complete the operation. Finally the control logic inserts the sign of the result into the least significant bit place of column 14 of the register Ra.

The subtraction operation is performed in the same manner as was described for the addition operation with the exception that the control logic first performs a dry run of the operation to determine which number is larger. The control logic 41 then sends commands to the arithmetic unit 25 over channel C which set it up so that it subtracts the contents of the register storing the larger number from the contents of the register storing the smaller number.

After performing the addition or subtraction operation it is necessary to perform well known corrections on some of the digits of the result in order to express the result properly in binary-decimal code. To accomplish this the bits of the result, stored in register Ra are transferred to the arithmetic unit 25 one at a time, operated upon, and restored in the register Ra. In this portion of the operation, since only one memory register is involved, the bit counter 57 may be incremented on every memory cycle instead of every second memory cycle.

The arithmetic unit 25 may be similar to that described in U.S. Pat. No. 3,304,418 which is assigned to the assignee of the present invention.

Jumping

When a jump instruction is inserted into the instruction register 13 the control logic 41 tests the jump condition specified in the second character of instruction and performs the jump if this condition is set or if the jump specified by the second character is unconditional. The different jump conditions specified in the second character may test whether a selected bit in the service area memory 19 is set, whether the sign of the I/O register 23 is negative or whether the contents of the I/O register 23 are not equal to zero. In the first two cases the control logic 41 inserts the addressed bit into the counter system 53 and senses the bit. In the third case, the control logic clears the counter system 53 and then steps it through the I/O register 23 testing each bit in turn.

The bits in the service area tested by the various jump conditions may be set from the keyboard 21, by a program instruction, or by the occurrence of an overflow condition in a multiplication operation.

The program address to which the jump is to be made is specified in the third and fourth characters of the jump instruction. If the jump is unconditional or if the condition has occurred, the control logic 41 inserts the address of the least significant bit of the address storing portion 35 of the service area into the counter system 53 and transfers the 8-bit jump address to the portion 35 from the instruction register 13. In this case the overflow of the bit counter 57 is used to increment the register counter 51 rather than the column counter 55.

After completing the transfer, the control logic 41, without first incrementing the address in the portion 35, orders the tape unit 11 to send the next instruction to the instruction register 13 in the normal way. If the jump condition has not occurred, the transfer is not executed. The control logic 41 just increments the address in the address portion 35 in the normal manner and orders the tape unit 11 to send the next instruction to the instruction register 13.

If the jump is to be executed and the third character of the jump instruction is zero, the control unit 41 inserts the address of the indirect address register 29 into the counter system 53 and transfers the contents of the indirect address register 29 to the third character place 47 of the instruction register 13. This is then used as a portion of the program address in the jump instruction.

Multiplication

Multiplication is performed between the contents of the I/O register 23 and the register Ra addressed by the third character of the multiplication instruction. The product is formed in the register Rb addressed by the fourth character of the instruction. In carrying out the operation, the computer first adds the multiplicand in the I/O register 23 to the contents of the register Rb the number of times specified by the least significant digit of the multiplier in the register Ra. Next the partial product in the register Rb is shifted and rounded to one digit toward the least significant digit. Then the computer adds the contents of the I/O register 23 to the contents of the register Rb the number of times specified by the second digit of the multiplier in Ra.

This process of shifting and adding is repeated until 14 shifts have taken place and the least significant digit of the product is again in the least significant digit place of the register Rb.

To perform these operations the control logic 41 first clears the register Rb and the 4 bit counter 63 and then transfers the least significant character of the register Ra to the 4-bit counter 65. If the contents of the counter 65 are not zero the control logic 41 then decrements the counter 65 and adds the contents of the I/O register 23 to the register Rb, whose contents are in this case equal to zero, with the result going into the register Rb in the same manner as was described for addition. The control logic 41 repeats these operations of decrementing and adding until the contents of the counter 65 are zero. When the counter 65 is zero the control logic 41 increments the counter 63 and shifts the contents of the register Rb end-around one digit toward the least significant character. After doing this the control logic 41 transfers the contents of the counter 63 to the counter 55 and the contents of the third character portion 47 of the instruction register 13 to the counter 51. Next the control logic 41 shifts the addressed character from the register Ra to the register 65. The control logic 41 then repeats the operations of decrementing the counter 65 and adding the I/O register 23 to the register Rb until the contents of the counter 65 are again zero when it once again increments the counter 63 and starts another cycle of the multiplication.

The control logic 41 counts the shifts of the register Rb in the counter 67. When the counter 67 indicates that 14 shifts have taken place, the least significant digit of the product is again in the least significant digit place of the register Rb and the multiplication is finished.

The second character of the multiplication instruction is used to indicate whether the multiplication is to take place with a multiplication of the product by $10^n$ or $10^{-n}$ where $n$ can be between 0 and 7. This is accomplished by carrying out only $14-n$ shifts in the case of multiplication of the product by $10^n$ and by carrying out $14+n$ shifts with the first $n$ shifts being end-off in the case of multiplication by $10^{-n}$.

If only $14-n$ shifts are to be carried out the control logic 41 inserts an initial value of $n$ into the counter 67. If $14+n$ shifts are to be carried out, the control logic 41 inserts an initial value of $n$ into the counter 67 and sets a flip-flop (not shown). While this flip-flop is set the counter 67 counts down towards zero on each shift. When the counter reaches zero it resets the flip-flop which causes it to begin to count up towards 14 on each shift. The first $n$ shifts, which take place while the flip-flop is set, are end-off.

The first character of the multiplication instruction may order the multiplication to take place with a rounding of the result by the insertion of 5000000 or 9999999 into the register Rb before the first addition of the contents of the register Rb and the I/O register 23 is performed. The rounding instruction in the first character of the multiplication instruction is always accompanied in practice by an instruction for multiplying the product in the register Rb by $10^{-7}$.

In performing a multiplication operation there are several circumstances which may result in an overflow of the product. Examples of this may be if the multiplication is to take place with a multiplication of the product by $10^n$ and the number of digits in the multiplier is Ra plus $n$ is larger than 14, or if the most significant digits of the partial product in the register Rb flow over to the locations occupied by the least significant digits of the partial product during the shifting and adding phase of the multiplication. If an overflow condition occurs a flip-flop (not shown) in the arithmetic unit 25 is set. After the multiplication operation is completed, the contents of this flip-flop are transferred by the control logic 41 to a preselected location in the service area of the memory 19.

Shifting

The shifting of the contents of a memory register takes place in the execution of an instruction having a multiplication operation code in its initial character. If both the third and fourth characters of the instruction are occupied by a memory register address, the shifting takes place in the course of the execution of the multiplication instruction as described above. If the third character of the multiplication instruction is equal to zero, no multiplication takes place but the contents of the memory register specified in the fourth character of the instruction are shifted by the amount indicated by the second character of the instruction. If both the third and fourth characters of the instruction are equal to zero, the contents of the I/O register 23 are shifted by the amount indicated by the second character of the instruction.

The first 3 bits of the second character of the instruction indicate the amount of the shift and may take on any value between 0 and 7. The last bit of the second character indicates whether the shift is to have the significance of a multiplication of the contents of the memory register by $10^n$ or $10^{-n}$ where $n$ is the number contained in the first three bits. In a multiplication by $10^{-n}$, the contents of the register are shifted end-off $n$ digit places toward the least significant digit place. In a multiplication by $10^n$, the contents of the register are shifted end-around $14-n$ places toward the least significant digit place.

Figure 6:
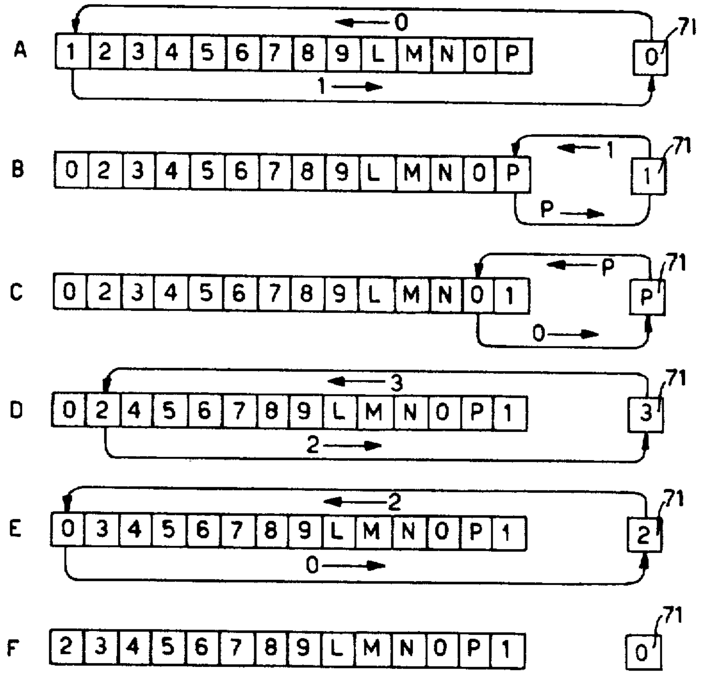
FIG. 6 illustrates how the shifting of the contents of a memory register is accomplished.

FIG. 6 of the drawings illustrates how the contents of a selected memory register 69 are shifted end-around one place toward the least significant digit place. The control logic 41 first (FIG. 6A) transfers the least significant character of the memory register 69 to a one character register 71 which may be located in the arithmetic unit 25. As the control logic 41 transfers the bits of the least significant character from the memory register 69 to the register 71 on the first half of each memory cycle, it also transfers the corresponding bits of the register 71 to the bit places of the least significant character of the memory register 69 on the second half of each memory cycle. In this way the addressed character place of the memory register 69 and the register 71 exchange their contents.

Next (FIG. 6B) the control logic 41 exchanges the contents of the most significant character place of the memory register 69 with the contents of the register 71, thereby transferring the least significant digit of the contents of the register 69 to the most significant digit place of the register 69. In the third step (FIG. 6C) the control logic 41 exchanges the contents of the next most significant digit place of the memory register 69 with the contents of the register 71 thereby completing the shift of the most significant digit of the contents of the memory register by one place towards the least significant digit place.

The control logic 41 continues to exchange the contents of the successively less significant digits of the contents of the memory register 69 with the contents of the register 71 until (FIG. 6E) it completes the shift by exchanging the contents of the least significant digit place of the register 69 with the contents of the register 71. This last exchange also restores the original contents of the register 71.

In order to shift the contents of the register 69 by a plurality of digit places, it is necessary to perform a series of one place shifts until the contents have been shifted by the desired amount.

If it is desired to shift the number in the register 69 end-off, the initial transfer of the contents of the least significant digit of the number in the register 69 to the register 71 is inhibited. In this way only the initial contents of the register 71 are transferred to the least significant bit place of the register 69 and the least significant digit of the contents of the register 69 is lost.

Tape Unit

The instructions of the program are stored on a loop of magnetic tape which is controlled by the tape unit 11.

In the illustrated embodiment of the invention, the instructions may be recorded on the loop in 5 tracks with each track containing up to 256 instructions. A single loop may be used to store several programs and the loops may be disposed in cartridges for making them easily interchangeable.

As stated above, the instructions may be interspersed on the tape in the manner illustrated in FIG. 2. After transferring an instruction to the instruction register 13 for execution the tape unit 11 does not stop the tape but keeps it moving. After the passage of a preselected time, before the next instruction to be executed is available on the tape, the tape unit 11 senses whether the execution of the previous instruction has been completed. If it is not completed, the tape unit 11 stops the tape until the control logic 41 signals that the execution is finished. If the instruction has been executed, the tape unit 11 keeps the tape moving and the control logic 41 compares, in comparator 39, the addresses of the successive instructions with the addresses of the next instruction to be executed stored in portion 35 of the memory 19. When the comparison yields equality, the instruction accompanying the address is transferred to the instruction register 13 for execution.

In this manner the delay in the access time for the subsequent instructions on the tape is minimized. With the exception of instructions which control the mechanical part of the machine and some multiplication instructions, the computer has finished the execution of the instruction in the instruction register 13 before the tape unit 11 makes its check. Thus the tape unit 11 is able to keep the tape moving for reading the next instruction to be executed. The time between the sensing of whether the execution of the present instruction is completed and the occurance of the next instruction to be executed on the tape must be enough to allow enough tape to pass under the read-write heads (not shown) to allow the stopping and restarting of the tape if the execution of the present instruction is not completed.

The contents of the tape may be printed out on the printer 27 and a program may be recorded on the tape in response to commands by the operator from the keyboard 21.

In the case of recording information on the tape the successive instructions are entered from the keyboard 21 by the operator.

Peripheral Units

The instruction repertoire of the computer according to the invention includes instructions for controlling the printer 27 and the keyboard 21 and may include instructions for controlling peripheral units which may be coupled to the basic computer.

These peripheral units may include, for instance, a paper tape reader and punch, a transmission terminal and other units necessary in a particular application.

In some cases the computer according to the invention is able to overlap the execution of two or more instructions.

For instance, when a first instruction for controlling the tabulation is being executed, after the control logic 41 sends the commands to the mechanical tabulation mechanism, the computer is able to execute a following instruction which does not involve the tabulation mechanism and does not have to wait until the relatively slow mechanical mechanism completes its operation.

What we claim is:

1. An electronic computer comprising:

control logic for controlling the operation of the computer, a cyclic, serial access memory or storing the instructions of a program to be executed, said cyclic memory including a loop of magnetic tape having an information track on which the instructions are recorded, and an address associated with each instruction on said track, said instructions each being formed of a fixed number of characters, one of said characters being able to define the significance of the remaining characters, an instruction register for receiving the successive instructions of the program one at a time from said tape unit under the control of said control logic and for storing each instruction while it is being executed, a random access memory including a plurality of registers for storing data to be operated upon, a predetermined one of said data registers being used as an input-output register, an indirect address portion associated with said input-output register for storing an indirect address transferrable to a predetermined portion of said instruction register under the control of said control logic for use as an indirect address in the instruction then being executed, said predetermined portion of said instruction register containing at least one remaining character of the characters of said instruction, said at least one remaining character conditioning said predetermined portion of said instruction register for storing said indirect address according to the value of said at least one remaining character, said random access memory including a portion for storing the address on the tape of the instruction presently being executed, and an arithmetic unit for performing addition, subtraction and transfer operations between data stored in said input-output register and a selected one of the other registers of said random access memory under the control of said control logic, said random access memory and said arithmetic unit being responsive to commands from said control logic for incrementing the address stored in said tape address storing portion of said random access memory at the end of the execution of an instruction.

2. The computer of claim 1 wherein said serial access memory further includes means for sensing, a predetermined time after transferring an instruction to said instruction register, whether the execution of said transferred instruction by the comparator is completed, and means for halting the movement of said tape if the execution of said transferred instruction has not been completed.

3. The computer of claim 1 wherein said control logic includes means responsive to the presence of a jump instruction in said instruction register for transferring the portion of said jump instruction stored in a predetermined portion of said instruction register to said tape address storing portion of said random access memory.

4. The computer of claim 1 wherein said control logic is responsive to the presence of a multiplication instruction in said instruction register for performing a multiplication operation between a multiplicand in the input-output register and a multiplier in a first selected memory register and forming the product in a second selected memory register, and wherein said computer further includes:

a first counter for counting the successive digit places of the first selected memory register starting from the least significant digit, a second counter for receiving under the control of said control logic the successive digits of the first selected memory register indicated by said first counter, said control logic including means for successively adding the contents of said input-output register to said second selected memory register and decrementing said second counter until said second counter arrives at zero, the arrival at zero by said second counter acting to increment said first counter, the incrementing of said first counter causing said control logic to transfer the next digit of the multiplier to said second counter, means for shifting the contents of said second selected register unit end-around one digit place toward the least significant digit upon the arrival at zero of said second counter, and means for counting the number of shifts by said shifting means and for terminating the multiplication operation when the least significant digit of the product is shifted into the least significant digit place of said second selected memory register.

5. An electronic computer having a control logic, an arithmetic unit operating under the control of said control logic, a program memory for storing program instructions to be executed by said logic and an address associated with each one of said instructions, and an instruction register controlled by said logic for causing each program instruction to be transferred from said program memory to said instruction register to be stored while it is being executed, wherein the improvement comprises:

an indirect address register controlled by said logic for storing an indirect address and for transferring this indirect address to a predetermined portion of said instruction register, said logic conditioning said instruction register to use said indirect address for the instruction then being executed and for storing it in said program memory, each of said instructions being formed of a fixed number of characters, one of said characters being able to define the significance of the remaining characters, said predetermined portion of said instruction register containing at least one remaining character of the characters of said instruction, said at least one remaining character conditioning said predetermined portion of said instruction register for storing said indirect address according to the value of said at least one remaining character.

6. A computer according to claim 5, comprising:

a random access memory including a plurality of registers for storing data to be processed by said arithmetic unit, said indirect address register being formed of a portion of and being associated with a predetermined register of said random access memory used as an input-output register.

7. A computer according to claim 5, wherein said program memory is of the cyclic serial access type comprising a loop of magnetic tape having at least an information track on which said instructions are recorded and a portion on which the associated addresses are recorded, comprising means for incrementing the address stored in said serial access memory at the end of the execution of an instruction, said serial access memory and said arithmetic unit being controlled by said logic for operating said incrementing means.

8. A computer according to claim 7, characterized by means for sensing, a predetermined time after transferring an instruction to said instruction register, whether the execution of said transferred instructions has been executed, said sensing means controlling a means for halting the movement of said tape as long as the execution of said transferred instructions has not been completed.

9. A computer according to claim 8, wherein said logic includes means responsive to the presence of a jump instruction in said instruction register for transferring at least a part of said jump instruction to the portion of said tape storing the said address, said part of the jump instruction being stored in a predetermined portion of said instruction register.

10. A computer according to claim 6, wherein said logic is responsive to the presence of a multiplication instruction in said instruction register for multiplying a multiplicand stored in an input-output register by a multiplier stored in a first register of said random access memory and for accumulating the product in a second register of said random access memory, comprising:

a first counter for counting the successive digit places a said first register starting from the least significant digit, and a second counter for receiving under the control of said logic the successive digits of said first register indicated by said first counter, said logic including means for decrementing said second counter until said second counter arrives at zero, the arrival at zero by said second counter acting to increment said first counter and causing said logic to transfer the next digit of the multiplier to said second counter.

11. A computer according to claim 10, comprising:

means for shifting the contents of said second register end-around one digit place toward the least significant digit upon the arrival at zero of said second counter, and means for counting the number of shifts by said shifting means and for terminating the multiplication operation when the least significant digit of the product is shifted into the least significant digit place of said second register.

12. A computer according to claim 11, wherein said second register comprises a plurality of serially arranged cells, each one adapted to store one character, said shifting means comprising a single character register, and exchanging means controlled by said logic for exchanging a character from a selected cell of said second register with the character of said single character register, said exchanging means at first exchanging the character of said single character register with the character of the cell at one end of said second register and sequentially exchanging, after having performed said first exchange, the successive characters of said second register with the character each time stored in said single character register, starting from the character of the cell at the other end of said second register, said counting means indicating to said logic when all the characters of said second register have been exchanged for halting the operation of said exchanging means.

13. A computer according to claim 12, characterized in that said logic includes means for selectively inhibiting the transfer of the character at said one end of said second register to said single character register during the first exchange of the character.

* * * * *

UNITED STATES PATENT OFFICE

CERTIFICATE OF CORRECTION

Patent No. 3,691,531 Dated September 12, 1972

Inventor(s) Fabrizio Saltini and Vittorio Eccettuato

It is certified that error appears in the above-identified patent and that said Letters Patent are hereby corrected as shown below:

Col. 14, line 40 alter "or" to --for--.

Col. 14, line 51 delete "unit"

Signed and sealed this 6th day of August 1974.

(SEAL)
Attest:

McCOY M. GIBSON, JR.
Attesting Officer

C. MARSHALL DANN
Commissioner of Patents